United States Patent
Upendran

(10) Patent No.: US 7,770,229 B2
(45) Date of Patent: *Aug. 3, 2010

(54) SYSTEM AND METHOD FOR THE PROPAGATION OF DRM PROTECTED CONTENT

(75) Inventor: Manish Upendran, San Jose, CA (US)

(73) Assignee: Yahoo! Inc., Sunnyvale, CA (US)

(*) Notice: Subject to any disclaimer, the term of this patent is extended or adjusted under 35 U.S.C. 154(b) by 1252 days.

This patent is subject to a terminal disclaimer.

(21) Appl. No.: 11/322,661

(22) Filed: Dec. 30, 2005

(65) Prior Publication Data

US 2006/0259982 A1    Nov. 16, 2006

Related U.S. Application Data

(60) Provisional application No. 60/680,545, filed on May 11, 2005.

(51) Int. Cl.
    *G06F 7/04*    (2006.01)
(52) U.S. Cl. .................... 726/30; 726/28; 380/282; 709/229
(58) Field of Classification Search .............. 726/26, 726/28, 29, 30, 31, 32, 33
See application file for complete search history.

(56) References Cited

U.S. PATENT DOCUMENTS

| | | | |
|---|---|---|---|
| 7,382,879 B1* | 6/2008 | Miller | 380/201 |
| 2004/0006694 A1* | 1/2004 | Heelan et al. | 713/168 |
| 2004/0010717 A1* | 1/2004 | Simec et al. | 713/201 |
| 2005/0172340 A1* | 8/2005 | Logvinov et al. | 726/26 |
| 2006/0195514 A1* | 8/2006 | Rogers et al. | 709/203 |
| 2006/0195909 A1* | 8/2006 | Boswell et al. | 726/26 |
| 2006/0259852 A1* | 11/2006 | Upendran et al. | 715/500.1 |

* cited by examiner

*Primary Examiner*—Pramila Parthasarathy
(74) *Attorney, Agent, or Firm*—Seth H. Ostrow, Esq.; Ostrow Kaufman & Frankl LLP

(57) ABSTRACT

The present invention may be utilized for the distribution of content items protected according to various digital rights management platforms. According to one embodiment, a method for the propagation of DRM protected content to one or more devices connected to a network comprises generating a request for DRM protected content from a requesting device and streaming the requested DRM protected content from a content source as a protected DRM stream. The protected DRM stream is re-encrypted for streaming to the requesting device. The re-encrypted protected DRM stream is decrypted for playback on the requesting device.

13 Claims, 13 Drawing Sheets

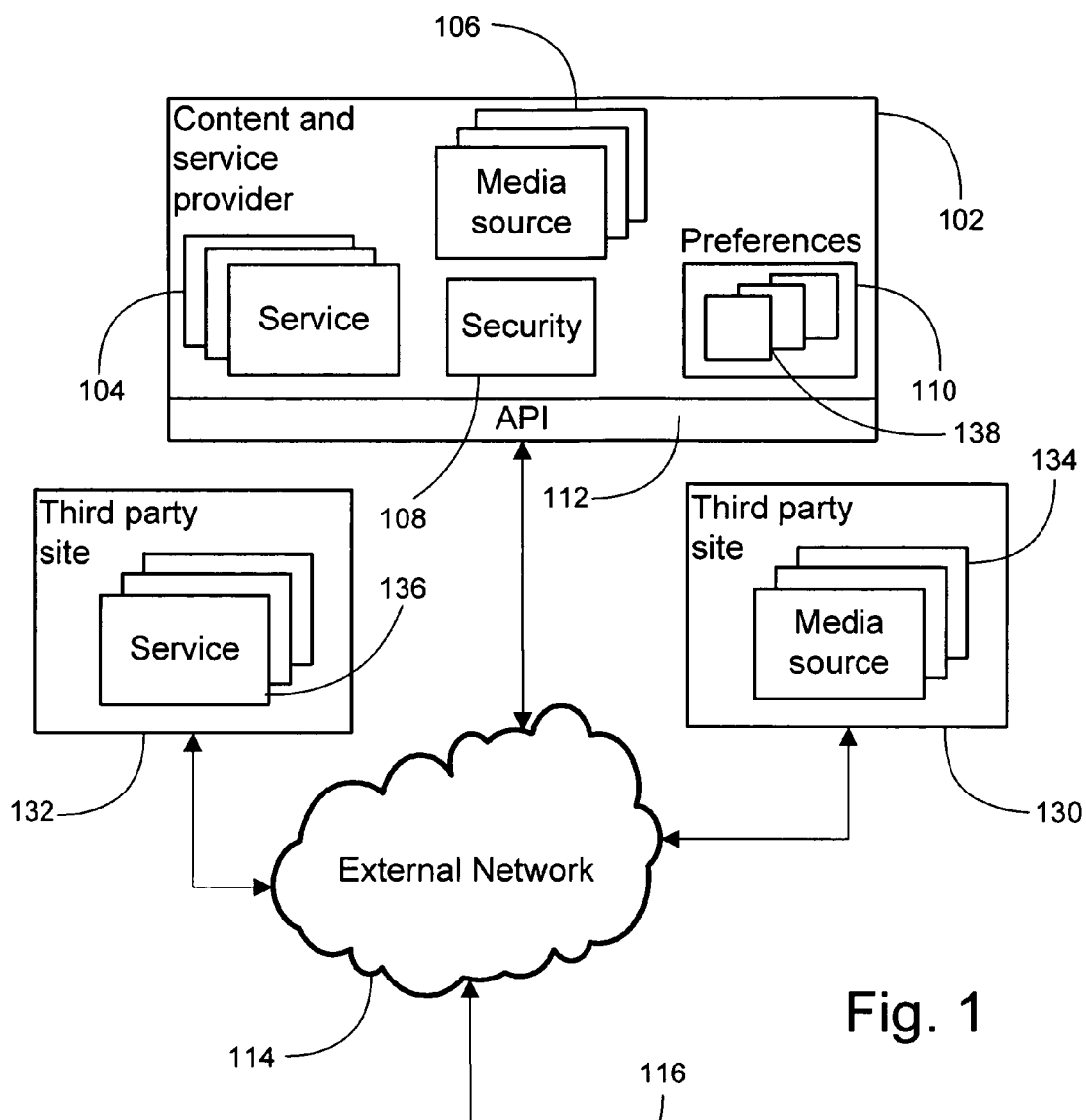
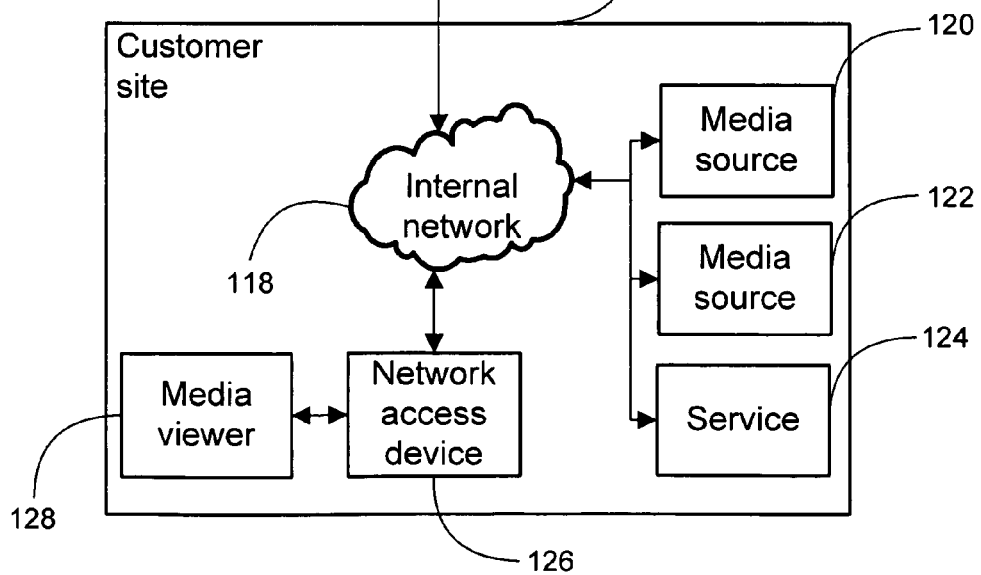
Fig. 1

SYSTEM AND METHOD FOR THE PROPAGATION OF DRM PROTECTED CONTENT

The present application claims priority to U.S. Provisional Application No. 60/680,545, entitled "SYSTEM, METHOD AND FRAMEWORK FOR UNIVERSAL ACCESS TO CONTENT AND SERVICES," filed on May 11, 2005 and the disclosure of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally relates to systems, methods and frameworks for accessing content and services in a location independent manner from arbitrary devices attached to a network. More specifically, the present invention relates to systems, methods and frameworks for providing access to content and services located on a local network, a content and service provider's system on a wide area network, or a third party system on a wide area network from arbitrary devices attached to a network to local and in communication with a wide area network.

BACKGROUND OF THE INVENTION

Currently, users may employ client devices such as personal computers (PCs), PDA's, smartphones, etc. with access to wide area networks, e.g., the Internet, to share content from various online services. Using a PC, a user may access content and services including, but not limited to, music and video downloads, photo sharing, and information access, e.g., news, weather, sports, financial content, etc. Additionally, providers of content and services allow users to create personal profiles to indicate preferences with regarding to the content and services that they wish to receive, as well as from communities of users for the exchange of content and services.

In addition to the growth in the use of networked personal computing devices, there has also been significant growth in the deployment of local area networks that provide computing devices with access to wide area networks, for example, a local area network within the home connected to a wide area network such as the Internet to provide computing devices within the home with access to the Internet in addition to local resources. Similarly, there has been significant growth in the deployment of media access devices, such as digital media adapters, set-top boxes, Internet appliances, etc., which are also connected to local area networks. There is currently no way, however, to extend access to content and services from a variety of sources to popular media access devices in a seamless manner. Furthermore, there are no systems or techniques for extending access to content and services from a variety of source while retaining user preferences and community identity.

Accordingly, there is a need for systems, methods and frameworks for providing access to content and services located on a local network, a content and service provider's system on a wide area network, or a third party system on a wide area network from arbitrary devices attached to a network and in communication with a wide area network. There is a further need to provide access to such content and services while retaining user preferences and community identity.

SUMMARY OF THE INVENTION

The present invention is directed towards systems and methods for providing universal access to content and services, including user interfaces and content items protected according to various digital rights management platforms. According to one embodiment, the invention is directed towards a system for providing access to content or services. The system comprises one or more servers, each server operative to store content or service preferences for a plurality for users and to determine content or service sources for a given user based on the given user's preferences and one or more client software applications, each application operative to deliver content or services based on a given user's preferences, the client software applications residing on hardware devices at customer locations. An internal network accessible at a client location provides a communications pathway to a content management system for receiving data describing content or services over the internal network from the client software applications and for managing such data. A network access device is communicatively coupled to the internal network and receiving content or service for presentation of content or services to the user through the media viewer. The content management system may reside on the network access device. Alternatively, the content management system resides on an external network that is remote from the client location.

The system may be utilized to access a variety of types and formats of content. The content may comprise music content and video content (including one or more television programs or movies). Services accessible by the present system include, but are not limited to, an instant messenger service, a music engine service and a toolbar service. The content or service sources may be maintained by one or more third parties, which may be identified by a user profile for a given user. User preferences for a given user may be set according to input from the given user. Alternatively, or in conjunction with the foregoing, user preferences may be set according to actions by the given user.

As indicated above, the present invention contemplates systems and methods for the propagation of user interfaces to requesting client devices. According to one embodiment, a method for the propagation of a user interface to one or more devices connected to a network comprises transmitting a request for a user interface to a user interface provider from a requesting device and receiving a link to the user interface from the user interface provider. The link is forwarded to the requesting device, which uses the link to retrieve the user interface.

Transmitting the request may comprise transmitting the request to a user interface server or a user interface web service, which may be operated by the user interface provider. The request may be transmitted from a digital media adapter or other client device. According to one embodiment, the request is transmitted from a digital media adapter to a local PC, which forwards to the user interface provider. The link is received by the local PC, which forwards the link to a digital media adapter. Using the link may comprise accessing an address at the user interface provider to retrieve the user interface, which may be conduced the digital media adapter.

The requesting device displays the user interface, which may include displaying by a digital media adapter. Additionally, the requesting device may be identified and a personalized user interface generated for the identified requesting device.

The method may further comprise client validation and availability checking. Accordingly, the availability of the user interface provider is determined. If the user interface provider is unavailable, the requesting device displays an error message. A requesting client may also be validated. If the requesting client is unable to be validated, the requesting client displays an error message.

The present invention may be utilized for the distribution of content items protected according to various digital rights management platforms. According to one embodiment, a method for the propagation of DRM protected content to one or more devices connected to a network comprises generating a request for DRM protected content from a requesting device and streaming the requested DRM protected content from a content source as a protected DRM stream. The protected DRM stream is re-encrypted for streaming to the requesting device. The re-encrypted protected DRM stream is decrypted for playback on the requesting device. A client device, which may be a digital media adapter, generates the request.

The DRM protected content may be streamed in accordance with the Windows Media DRM platform. When streaming, a determination may be made as to whether a valid license exists to provide access to the protected DRM stream. Accordingly, a license server may be queried for a valid license. An error message is generated where a valid license does not exist to provide access to the protected DRM stream, which is displayed on a client device. Additionally, according to one embodiment, streaming comprises streaming to a local PC.

The method may also comprise receiving a public key from the requesting device and re-encrypting the protected DRM stream using the received public key. The re-encrypted protected DRM stream may be steamed in accordance with the Windows Media DRM—Network Device platform. Streaming the re-encrypting protected DRM stream may comprise streaming from a local PC to a digital media adapter or similar client device. The requesting device may decrypt the stream using a private key to decrypt the re-encrypted protected DRM stream. A check is made to determine whether the private key matches a public key used to re-encrypt the protected DRM stream. If the private key matches the public key, the re-encrypted protected DRM stream is decrypted. Where the private key does not match the public key, the client device displays an error message.

BRIEF DESCRIPTION OF THE FIGURES

The invention is illustrated in the figures of the accompanying drawings which are meant to be exemplary and not limiting, in which like references are intended to refer to like or corresponding parts, and in which:

FIG. 1 is a block diagram illustrating a high level system for providing universal access to media and services according to one embodiment of the present invention;

DETAILED DESCRIPTION OF THE INVENTION

Figure 2:
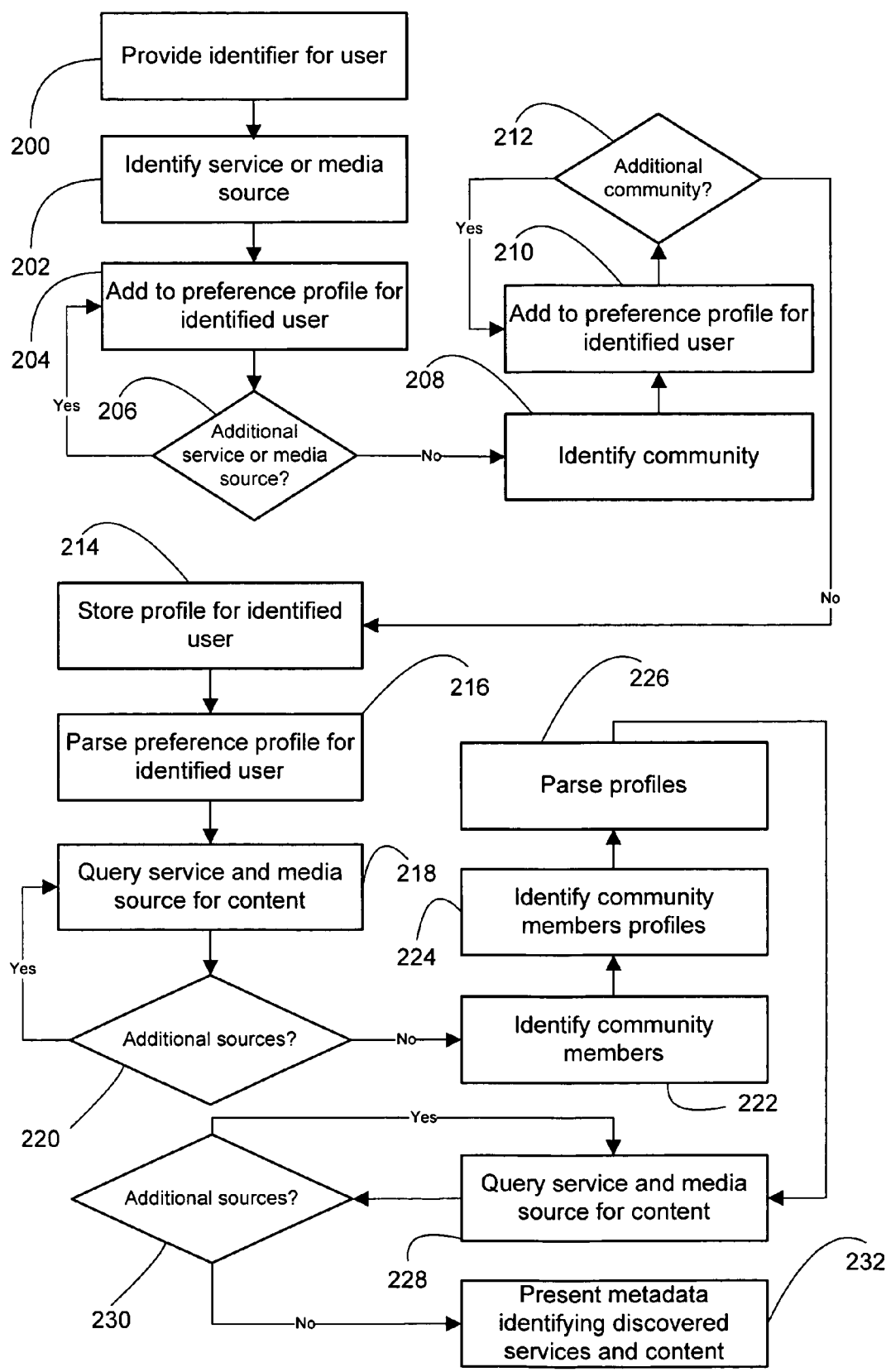
FIG. 2 is a flow diagram illustrating a method for the creation and use of a preference profile for providing universal access to media and services according to one embodiment of the present invention.

With reference to FIGS. 1 through 12, embodiments of methods, systems and frameworks according to the present invention are presented. Referring to FIG. 1, a system for providing universal access to content and services generally includes a content and service provider 102, a customer site 116 and one or more third party sites, 130 and 132, respectively, all of which are in communication over an external network 114.

The content and service provider 102 is one source of content and services for consumption by a user, which may be consumed at a customer site 116. The content and service provider 102 comprises one or more services 104, one or more media sources, a security sub-system 108 and a preferences sub-system 110. The content and service exposes a set of functions through an Application Program Interface ("API") 112 which, as is described in greater detail herein, the user may invoke to access the services 104, media 106, security 108 and preference 110 functions of the content and service provider 102. The security sub-system 108 controls access to the services 104 and media sources 106 at the content and service provider 102, for example, through the use of unique username and password credentials for each user accessing the content and service provider 102.

The preferences sub-system 110 allows a user to create a preference profile. The preference profile identifies one or more preferences of a user. Information in a preference profile includes, but is not limited to, preferred services and media sources at the content and service provider, formatting and presentation of information that the user prefers, and addressing information for local services and media sources. The preference profile may also indicate one or more communities to which the user belongs, or identify one or more other users of the content and service provider with whom a given user maintains a trusted relationship. According to one embodiment, the preference sub-system 110 is a relational database management system ("RDBMS") that maintains one or more records for each user, with one or more given records comprising preference information for a given user. It should be appreciated by those of skill in the art that use records may be stored according to a number of data storage techniques, e.g., a file system or in a memory structure distributed across multiple devices.

A user at a customer site 116 may maintain one or more media sources 120 and 122, in addition to running one or more services 124. Media sources 120 and 122 and services 124 operating at the customer site 116 may be in communication with an internal network 118 such that other devices 126 on the local network may access the sources 120, 122 and services 124. According to one embodiment of the invention, the user may register or indicate the existence, address or other identifying information for local media 120, 122 and services 124 in his or her preference profile that the preference sub-system 110 maintains.

The user employs a network access device 126 in communication with the internal network 118 to access local media 120, 122 and services 124. The network access device 126 is coupled with a media viewer 128. The network access device 126 accesses local media 120, 122 and services 124 over the internal network 118 for presentation on the media viewer 128. The network access device 126 may also be in communication over the internal 118 and external 114 networks with the content and service provider 102 to access services 104 and media sources 106 at the content and service provider 102. The network access device, therefore, has unified access to local media 120, 122 and services 124 as well as remote services 104 and media 106. According to one embodiment of the invention, the content and service provider 102 provides access to the services 104 and media 106 according to a user's preference profile that the preference sub-system 110 maintains.

As described above, a user may indicate that he or she is a member of a community of users in the preference profile that the preference sub-system 110 maintains. Users in the community may operate third party sites 130, 132 that provide media and services, 134 and 136, respectively. It should be appreciated by those of skill in the art that each third party site may host combinations of one or more media source and services. Users of third party sites 130, 132 also create preference profiles using the preference sub-system 110 that indicate membership in one or more communities, as well as the address of any local media 134 or services 136 that they host. Therefore, a given user's preference profile that the preference sub-system 110 maintains identifies the user's local media 120, 122, and services 124, preferences with regarding to services 104 and media 106 that the content and service provider 102 is offering, and other individuals operating third party sites 130, 132 that are within a given community with the user.

A user controlling a network access device 126 may provide the user with unified access to media and services that are local to the customer site, e.g., over the internal network, as well as services and media that are remote to the customer site. The user's preference profile provides information that identifies the local and remote media and services. The advertisement and discovery of both local and remote media and services may operate according to standards based mechanisms, as is described in greater detail herein.

FIG. 2 illustrates a method for a user to create a preference profile identifying remote and local services and media sources for providing universal access to media and services according to one embodiment of the present invention. The method begins with the identification of a given user for which discovered content and services are to be presented, step 200. For the given user, a service or media source is identified, step 202 and added to the preference profile for the identified user, step 204. A check is performed to determine if additional services or media sources exist for the identified user, step 206. Where additional services and media sources exist, step 206, the additional service or media sources is added to the preference profile for the identified user, step 204.

Where no additional services or media source exist for the identified user, step 206, a community of users related to the identified user are determined, step 208. The community of users may be those users with whom the identified user maintains a relationship. According to one embodiment, the identified community is retrieved from a buddy list for the identified user. An identified community member is added to the preference profile for the identified user, step 210, and a check is performed to determine if additional community member exist, step 212. Where no additional community members exist, the profile for the given user is stored to a data store, which may be any combination of transient or persistent memory devices.

The preference profile for the identified user is parsed to determine the identified user's service and media sources, step 216, which are queried to determine the content available from a given service or media source, step 218. A check is performed to determine whether additional services or media sources exist, step 220, which are also queried to determine the content made available from the additional services or media sources, step 218. Where no additional service or media sources exist, step 220, community members for the identified user are determined by accessing the stored profile, step 222. Profiles for the members in the community with the identified user are retrieved, step 224, which are parsed to determine the services or media sources made available by a given community member, step 226.

The preference profile for a given community member is parsed to determine the given community member's service and media sources, step 226, which are queried to determine the content available from a given service or media source, step 228. A check is performed to determine whether additional services or media sources exist, step 230, which are also queried to determine the content made available from the additional services or media sources, step 228. Where no additional service or media sources exist, step 230, metadata is presented to the user identifying discovered service and content, step 232, which include both content made available from the identified user's services and media sources as well as content made available from services and media sources of the identified user's community members.

Figure 3A:
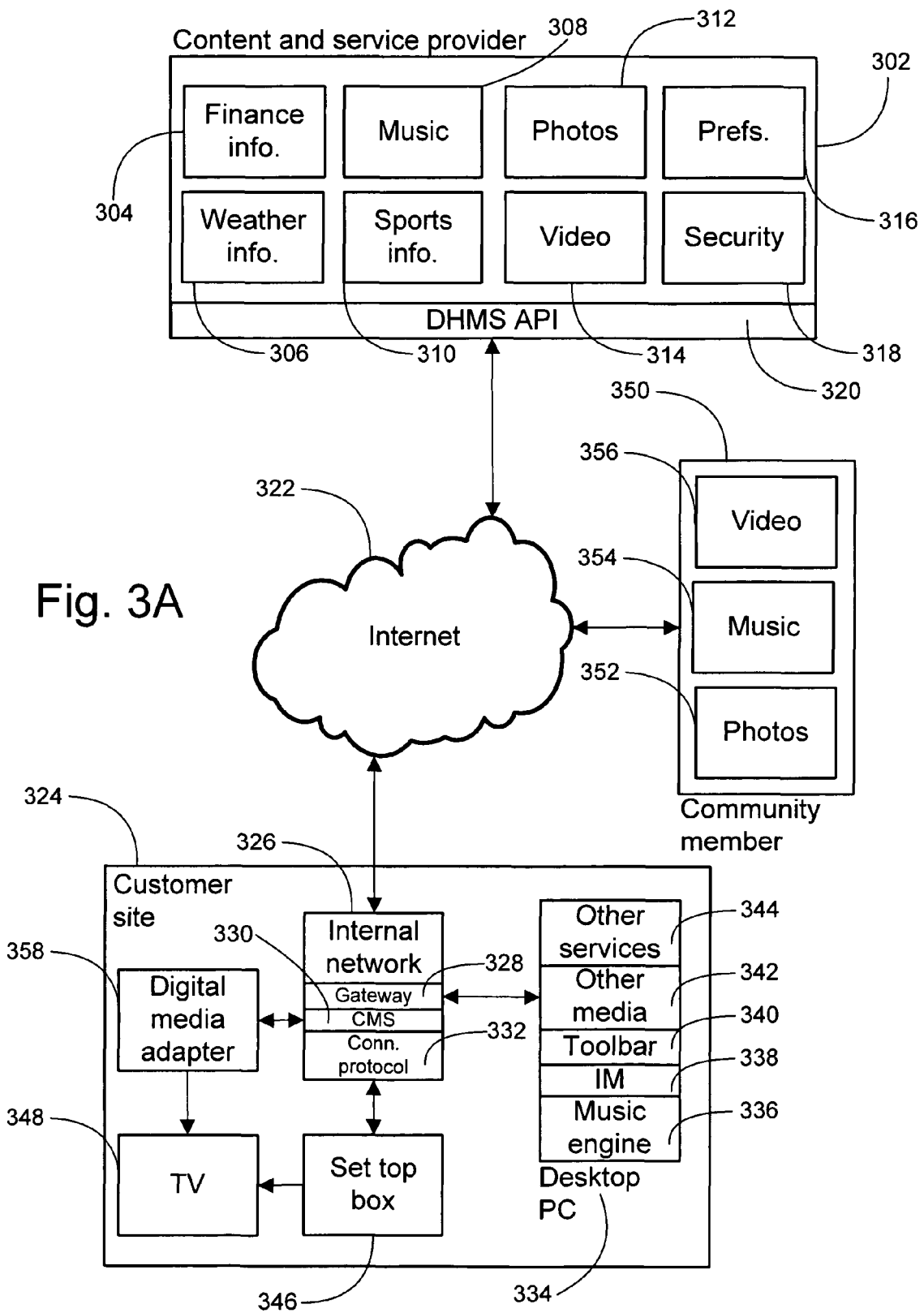
FIG. 3A is a block diagram illustrating a detailed system for providing universal access to media and services according to one embodiment of the present invention.

FIG. 3A presents block diagram illustrating a detailed system for providing universal access to media and services according to one embodiment of the invention. According to FIG. 3A, a content and service provider 302 provides access to one or more services and media sources. For example, services made available by the content and service provider 102 include, but are not limited to finance information services 304, weather information services 306 and sports information services 310. Similarly, media sources made available by the content and media service provider 102 include, but are not limited to, music 308, photos 312 and video 314. According to one embodiment of the invention, the content and media service provider is the MyYahoo! service, which provides access to services and media sources. The content and service provider 302 implements a digital home media service ("DHMS") API that exposes functions that allow access to the content and service provider's services 304, 306, 310 and media 308, 312, 314.

A security subsystem 318 controls access to the services 304, 306, 310 and media sources 308, 312, 314 that the content and service provider 302 makes available. Similarly, the security sub-system 302 controls access to the preference profile sub-system 316 and the substantive preference profile information. According to one embodiment, a call is made from the DHMS API 320 to the security sub-system 318 when a user attempts to access the preference profile sub-system 316, services 304, 306, 310 or media sources 308, 312, 314 at the content and service provider 302. The security sub-system 318 validates the user before providing access. Alternatively, a call is made from the DHMS API 320 to the security sub-system 318 when a user initially attempts to access a function of the API 320. The security sub-system validates the user and records an indication of the validation, e.g., through the use of a cookie or similar technology known to those of skill in the art, which may persist for the duration of the user's session. The security sub-system may validate the user according to one or more techniques know to those of skill in the art including, but not limited to, username and password, physical token, etc.

According to one embodiment, the services 304, 306, 308 and media sources 310, 312, 314 that the content and services provider 302 offers may be customized according to a user's preference profile. A preference sub-system 316 maintains preference profiles for one or more users of the system. The preference profile may be used to establish recommendations, favorites, and various other personal preferences on a per-user basis. This may include, for example, recommendations on a favorite radio station, information regarding current stocks in a user's stock portfolio, specific weather information on the basis of a user's area or zip code, favorite sports teams, favorite TV programs or genres, favorite movies or genres, favorite music or genres, etc. A user's preference profile may also comprise information regarding one or more communities to which the user belongs, which provides access to the preferences of other individuals in the community. Information regarding one or more communities to which the user belongs may be the basis for generating recommendations regarding media and services in which the user may be interested, as well as other media and services to which the user may be provided access.

According to the present embodiment, a customer site 324, which may be the home in which a user reside, comprises a desktop PC 334, an internal network 326, a set top box 346, a digital media adapter 358 and a television 348. The desktop PC 334 maintains one or more services and media sources. For example, the desktop PC 334 may maintain a music engine service 336 that provides access to music content, an instant messaging service 338 that allows the user to exchange instant messages with other users over combinations of the internal network 326 and the Internet 322 and a toolbar service 340, which may provide searching services, as well as access to the services 304, 306, 310 and media sources 308, 312, 314 of the content and service provider 302. According to one embodiment of the invention, the toolbar service 340 is the Yahoo! toolbar service, the instant messaging service is the Yahoo! instant messenger service and the music engine service is the Yahoo! music engine. The desktop PC 334 may also provide additional media 342 and services 344 as are well known to those of skill in the art, such as electronic program guide ("EPG") services and content searching services.

The desktop PC 334 is coupled to and in communication with an internal network 326 that provides a communications channel for devices within the customer site 324. The internal network is in communication with a wide area network, such as the Internet 322, to provide a communications channel to the content and service provider 302. The internal network 326 comprises a gateway 328, a content management system ("CMS") 330 and a connection protocol 332. The gateway 328 provides connectivity between the internal network 326 and the Internet 322.

The CMS 330 provides directory services for other devices on the internal network, e.g., a set top box 346 or digital media adapter 358, allowing those devices to identify and access services and media sources that are both local and remote to the customer site 324. The CMS 330 works in conjunction with the connection protocol 332 to allow devices to be attached to the internal network 326 and access local and remote services and media sources in an ad-hoc fashion. It should be noted that according to certain embodiments the internal network, including the gateway, CMS and connection protocol may be implemented in a single device, such as SOHO firewall/router/gateway device that implements the CMS and connection protocol. According to one embodiment, the content and service provider 302 provides the CMS 330 with preference profile information from the preference sub-system 346 via the DHMS API 320. The CMS 330 uses the preference profile information to identify specific services and media sources that are available to devices on the internal network 326, such as a set top box 346 or digital media adapter 358.

A number of suitable connection protocols that are known to those of skill in the art may be implemented in the internal network including, but not limited to, universal plug and play ("UPnP") and Bonjour (formerly known as Rendezvous), developed by APPLE COMPUTER, INC. Peer-to-peer sharing of services and media sources over the internal network and Internet are made possible using the CMS and connection protocol. According to one embodiment, the connection protocol initiates a discovery process to initiate peer-to-peer communication between one or more services. For example, a peer-to-peer communication may be initiated between a first instant messenger client communicating with a second instant messenger client or a music client. Advantageously, the CMS and connection protocol effectively separate data delivery from the user experience by allowing for consumption of content by arbitrary consumers with varying rendering capabilities. For example, a UPnP-enabled single-line display stereo system may be delivered the same audio data a digital media adapter that is capable of displaying photos and video in addition to audio content.

In addition to the content and service provider 302, services and media sources owned by community members 350 are made available to the user. Using the preference profile sub-system 316, a user may indicate one or more communities to which the user belongs, or one or more community members with which the user maintains a trusted relationship. A community member 350 may also use the preference profile sub-system 316 to create preference profiles, which may include addressing information for one or more services or media sources 325, 354, 356 that the community member maintains. Links or entries in the user's preference profile indicate a connection between the user and community member, which exposes addressing information for the community member's services and media sources to the user. The CMS 330 operating at the customer site 324 retrieves metadata representing content choices that may be generated from the user's preference profile information, which contains preferences or addressing information for the community member's services and media sources, to present service and media source choices to the user through the use of the set top box 346 or digital media adapter 358.

A set top box 346 or digital media adapter 358 is coupled to and in communication with the internal network 326. The CMS 330 and connection protocol 332 control discovery of services and media sources by the set top box 346 or digital media adapter 358. The CMS 330 provides the set top box 346 or digital media adapter 358 with information regarding available services 334, 336, 338, 344 and media sources 342 attached to the local network 326, as well as services 304, 308, 310 and media sources 308, 312, 314, 325, 354, 356 available through community members 350 and the content and service provider 302. According to one embodiment, this information is provided to the CMS from the user's preference profile, which is accessed through the functions exposed by the DHMS API. The CMS 330 provides the service and media source information to the set top box 346 or digital media adapter 358 for display on a television 348 as a unified set of information without regarding to the specific location or address of a given service or media source.

Figure 3B:
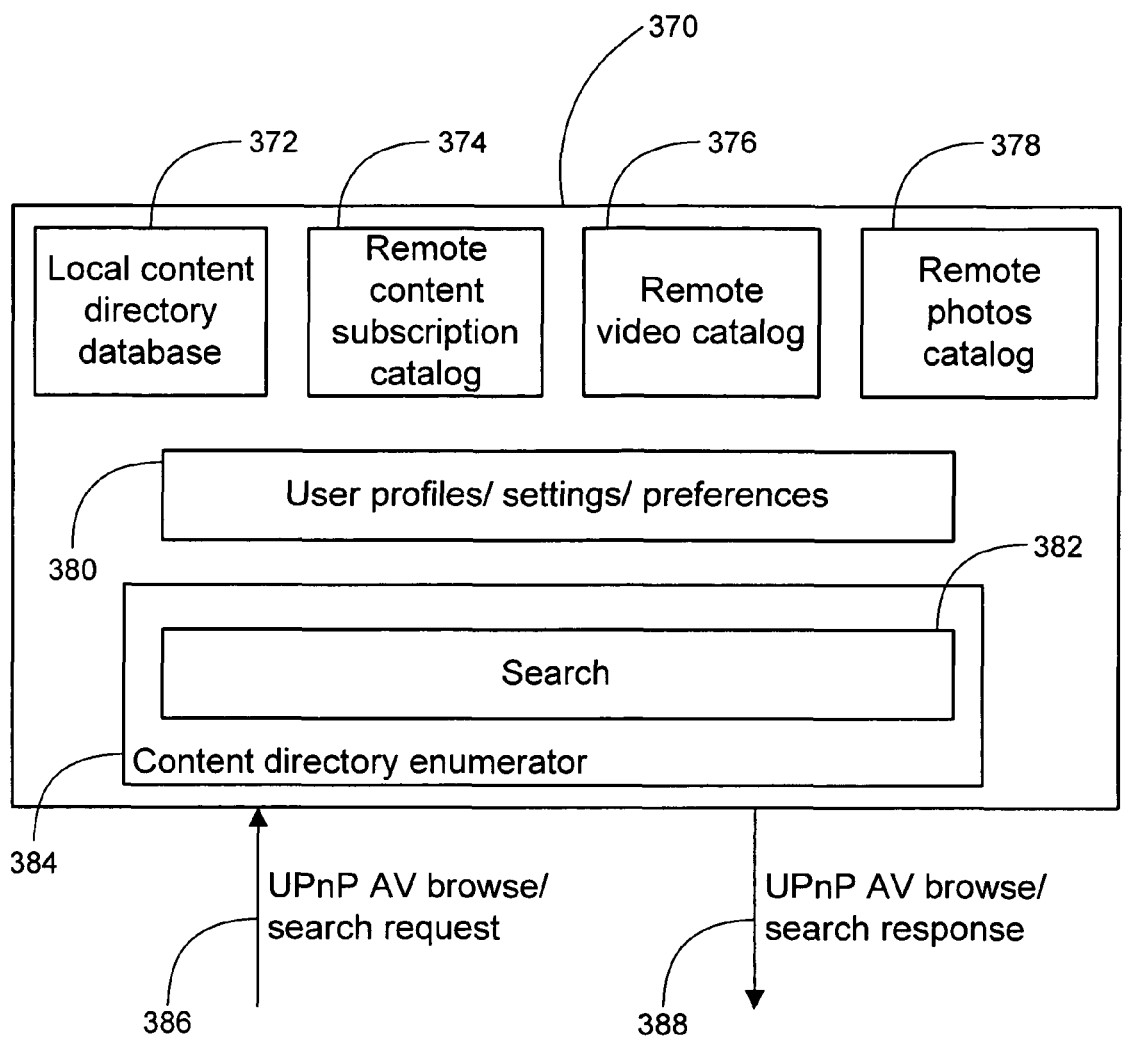
FIG. 3B is a block diagram illustrating a system for searching media according to one embodiment of the present invention.

According to one embodiment of the invention, the content management system provides users with search functionality that allows for the identification of content and services that are responsive to one or more search criteria. FIG. 3B presents the content management system 370 that provide search functionality. The content management system 370 organizes one or more content items or links to content items, which may reside on a local network with the content management system 370 or remote to the content management system 370, e.g., over the Internet. According to the embodiment of FIG. 3B, the content management system 370 organizes local content in a local content directory database 372, remote subscription content in a remote content subscription catalog 374, remote video in a remote video catalog 376 and remote photos in a remote photo catalog 378. It should be noted by those of skill in the art that other content sources, including local, remote and subscription sources may be managed by the content management system 370. Furthermore, the content management system may maintain combinations of content items and links to content items.

The content management system 370 also maintains one or more user profiles 380, which may identify settings and preferences for a given user. For example, a user profile 380 for a given user may identify the given user's local content for management by the content management system 370, one or more subscription services to which the given user subscribes and content for users in the given user's social network to which the given user has access. The user profile 380 may also identify setting and preferences for the given user including, but not limited to, ratings for content items, the identity of any users in the given user's social network, preferred content items or genres of content, etc.

In addition to the foregoing, the content management system 370 maintains a search component 382 that allows a given requestor to conduct searches for content and services 372, 374, 376, 378 managed by the content management system 370 based on the stored user preference profiles. The search component 382 utilizes a content directory enumerator 384 that provides translation services. The content management system 370 receives a UPnP AV browse or search request 386 from a client device for a given user. The content directory enumerator 374 receives the request 386, which the enumerator 374 translates into a format that the search component 382 may utilize. For example, the content directory enumerator 384 may be operative to receive requests 386 according to a number of formats or protocols, e.g., UPnP, Bonjour, etc., and translate a given request 386 into a canonical format that the search component 382 may utilize. The search component 382 receives a translated request from the content directory enumerator 384 and parses the request to identify the search criteria, which allows the search component 382 to identify the proper content data store 372, 374, 376, 378 and content for the user. The search component 382 packages the response as links to the identified content and associated metadata for transmission to the requestor, which may include the content directory enumerator translating the response into a UPnP AV browse or search response 388. Accordingly, users may search for and identify content and services that the content management system 370 maintains.

Figure 4:
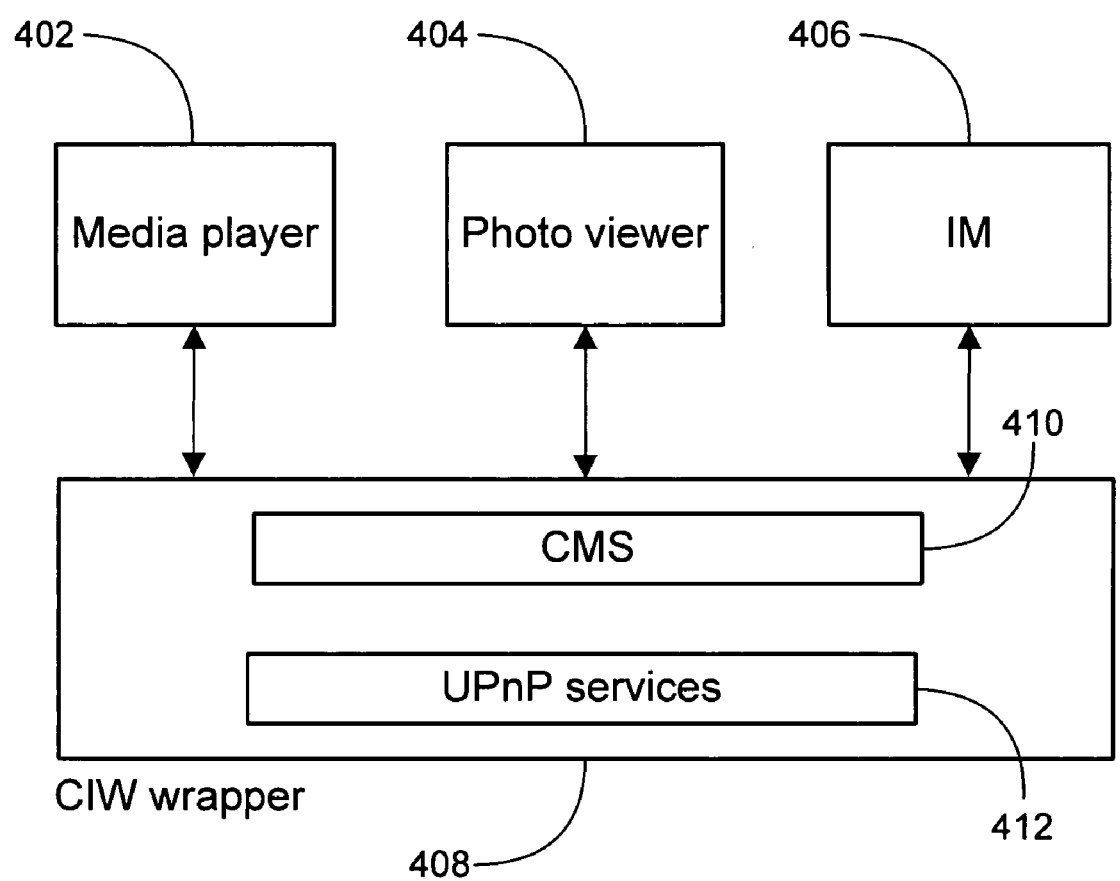
FIG. 4 is a block diagram illustrating an interface providing universal access to media and services according to one embodiment of the present invention.

FIG. 4 illustrates one embodiment of an interface for services and media sources, both local and remote to the customer site, to expose services and media sources to devices on the internal network of the customer site. According to one embodiment, the CMS satisfies the requirements to behave as a UPnP content directory service ("CDS") 410 and the connection protocol is implemented using UPnP 412. It should be appreciated by those of skill in the art that the CMS 410 may provide connections for and communicate according to multiple protocols and deliver content according to multiple service types, e.g., UPnP AV and Rendezvous. According to one embodiment, interfaces and callbacks to the CMS 410 are implemented via a common interface wrapper ("CIW") 408. According to an alternative embodiment, the CIW is implemented by exposing the appropriate interfaces via COM. It should be appreciated that the CIW may be implemented according to other techniques known to those of skill in the art, such as CORBA, Enterprise Java Beans ("EJB"), etc.

Services and media sources, such as a media player 402, photo viewer 404 and instant messenger 406 access the CMS 410 through interfaces exposed via the CIW 408. Services and media sources 402, 404, 406 interested in providing content metadata access the CMS 410 and "publish" content for viewing by other compatible devices. According to one embodiment, the CMS 410 receives the information for publication and advertises the content to all UPnP devices on a local network through the use of UPnP services 412. The architecture provides UPnP capabilities to services and media sources 402, 404, 406 in a scaleable and reusable manner. Alternatively, the CDS 410 may query the services and media sources 402, 404, 408 for content metadata, which it advertises to devices on the network through the use of UPnP services 412.

Figure 5:
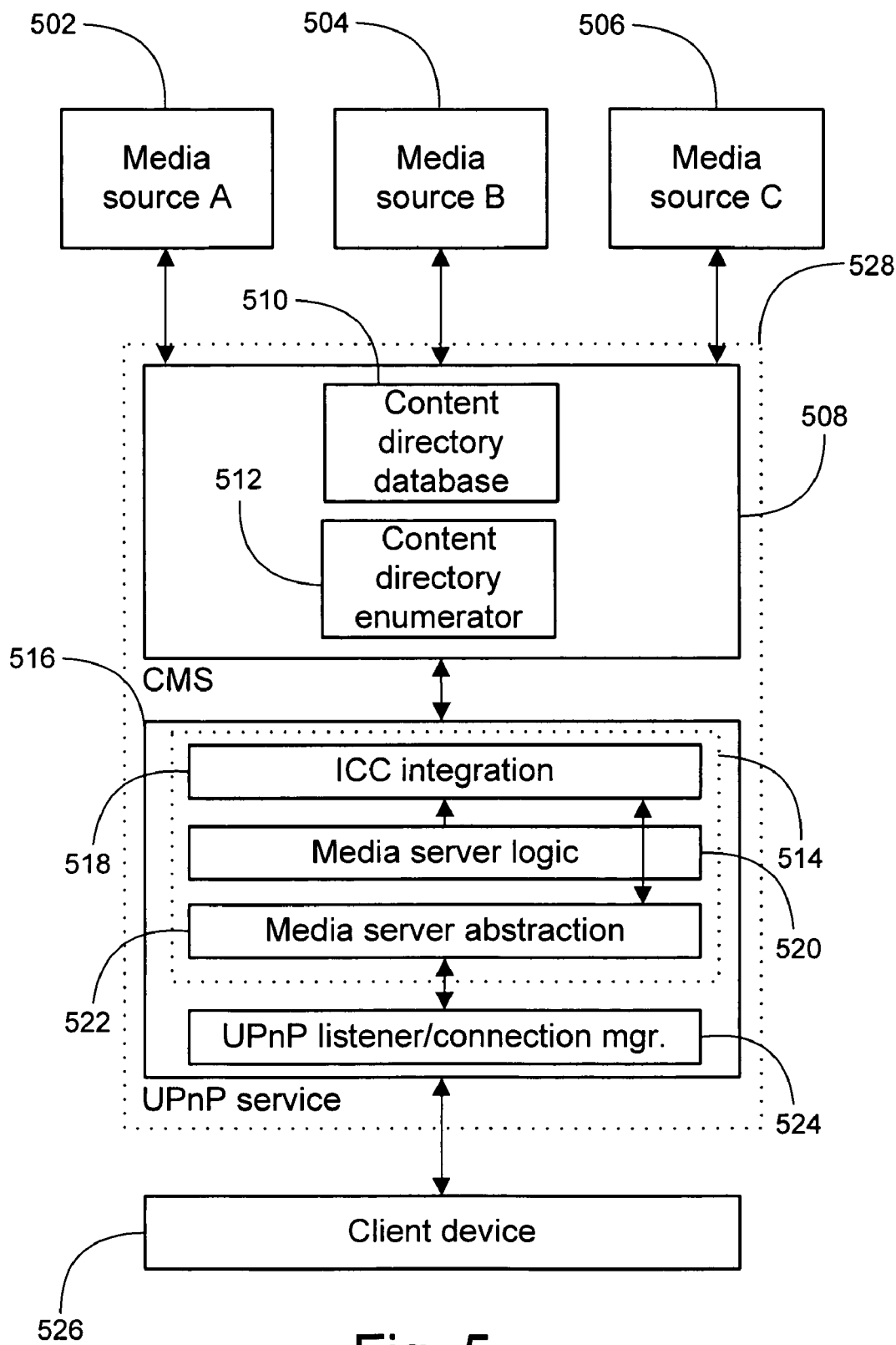
FIG. 5 is a block diagram illustrating an interface framework in conjunction with a UPnP server based on an Intel UPnP SDK for providing universal access to media and services according to one embodiment of the present invention.

The CMS 410 is agnostic to the actual location of the services and media sources for which it is publishing content. For example, the CMS 410 may publish media player services 402 located on the Internet, whereas it may also publish instant messenger services 406 located on the local network. According to one embodiment of the invention, the CMS 410 receives a user's preference profile, for example, from a content and service provider. The CMS 410 determines the services and media sources 402, 404, 406 to publish to the local network on the basis of information contained within the preference profile. By using a user's preference profile, the CMS may publish personalized services and media to the user's local network for viewing on UPnP devices including, but not limited to, set top boxes and digital media adapters FIG. 5 presents a block diagram illustrating an embodiment of a UPnP AV media server 528 providing a client device 526 with access to media sources 502, 504, 506, which may be on a local network with the client device 526 or located remotely over a wide area network. The UPnP AV media server comprises a content management system module 508 that provides access to one or more media sources 502, 504, 506, which may also include services. The content management system module 508 comprises one or more content directory enumerators 512 and content directory databases 510 for content metadata that the media sources 502, 504, 506 provide to the content management system service module 508. The content directory enumerators 512 contain one or more lists of enumerators that represent the media sources and services 502, 504, 506 that are available to the UPnP AV media server 528. Each registered enumerator may represent a separate metadata store. According to one embodiment, the content directory enumerator module 512 responds to metadata requests from the client device 526 via the UPnP service module 516, while allowing publication of metadata from the media sources and services 502, 504, 506, which is held in the module's storage 510.

The UPnP AV media server implements a UPnP services module 516 to provide UPnP services to media sources and services 502, 504, 506. The UPnP services module 516 comprises a UPnP listener/connection manager 524 and a translation layer 514. The UPnP listener/connection manager 524 is operative to listen for content and service requests that a client device 526 transmits over a network. For example, the UPnP listener/connection manager 524 may resolve and parse SOAP transaction headers and pass browse requests to the translation layer 514. The translation layer receives content and service requests from the UPnP listener/connection manager 524 and formats the requests for the retrieval of content and services by the CMS 508.

According to one embodiment, the translation layer 514 is based on the Intel UPnP SDK that is a modular and reusable framework such that clients designed to function within a home network may install the SDK, which thereby provides content to the UPnP network in a personalized manner. The translation layer 514 comprises a media server abstraction layer 522, media server logic layer 520 and an ICC integration layer 518. The MSA layer 522 may make a call back to the Intel content center integration ("ICC") layer 518, providing the browse request. According to one embodiment, the MSA layer is a single-threaded server that is primarily responsible for abstracting out the UPnP listener interfaces from the higher layers such as the ICC layer 518.

The ICC layer 518 may hand off the browse request to the media server logic ("MSL") layer 520 via an MSL callback mechanism. The MSL layer 520 may also be responsible for "eventing" all content requests back to the ICC layer 518 and receiving a fully constructed content directory object that reflects the request. The MSL layer 520 may make a call to convert the content directory object to a UPnP XML object using an XML descriptor language, such as DIDL-lite, and place it in a queue for asynchronous transmission to the client device 526. It should be noted by those of skill in the art that while the embodiment of FIG. 5 illustrates the content management system service module working in conjunction with a UPnP service module, the UPnP service module provides may be replaced with modules to provide connection services according to other connection protocols, such as Apple's Rendezvous zero-configuration network protocol.

Figure 6:
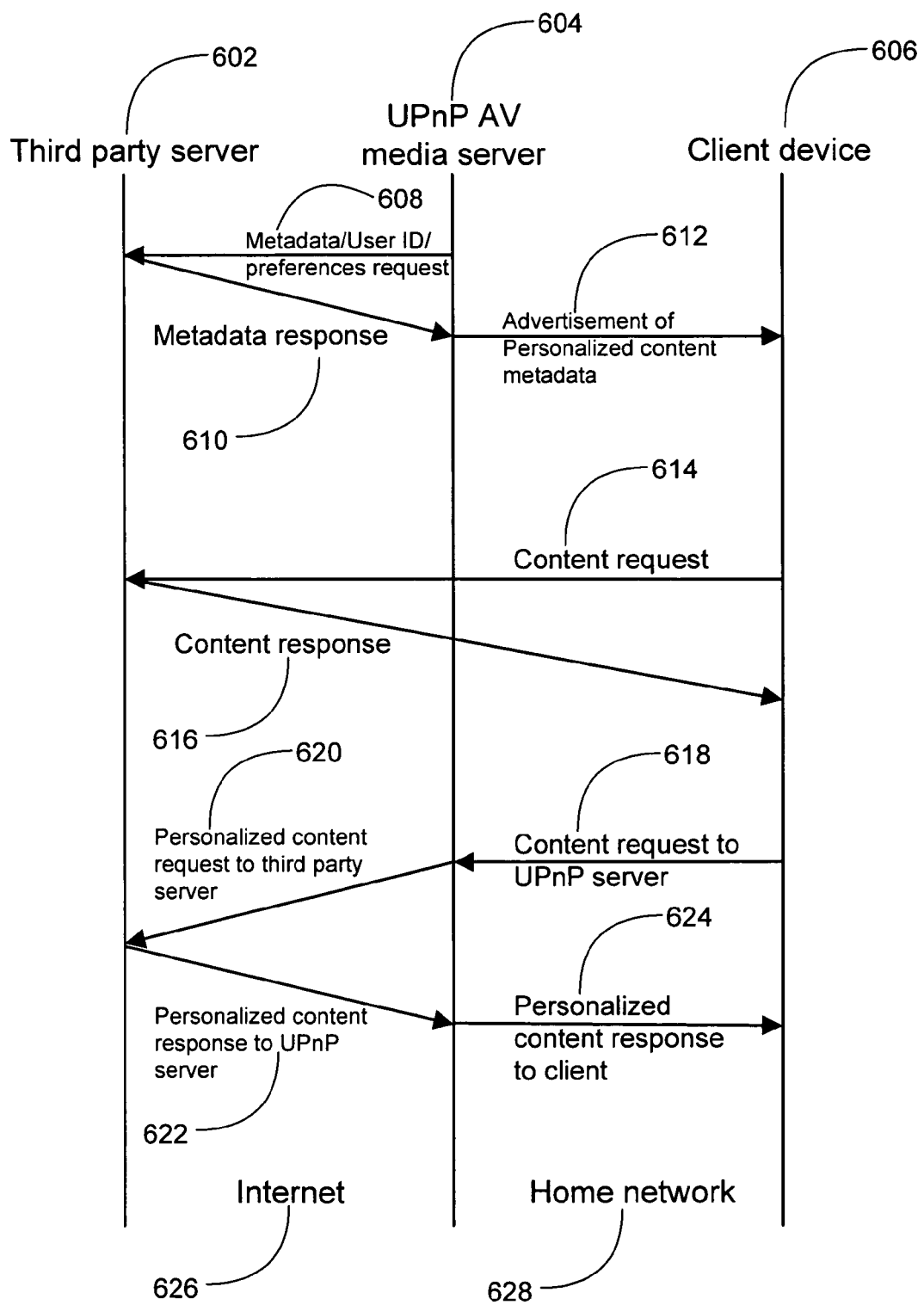
FIG. 6 is a swimlane diagram illustrating the interaction between a client, UPnP server and third party server according to one embodiment of the present invention.

FIG. 6 presents a swimlane diagram illustrating the interaction between a third party server 602, e.g., a content and service provider, a UPnP AV server 604 and a client device 606. According to the present embodiment, communication between third party servers 602 and the UPnP AV media server 604 may occur over the Internet 626, whereas communications between the UPnP AV media server 604 and client devices 606 occur over a home network 628.

A UPnP media server 604 issues a request for metadata, step 608, to one or more third party servers 602 for both authentication of the user and content access pertaining to a particular user. For example, the metadata request may request a play list of the user's personalized services and media sources be downloaded. The third party server 602 may respond to such a request that contains the appropriate authentication credentials, e.g., username and password, with content metadata by issuing a metadata response that is specific to the user making the request, step 610. The content data that the user has deemed appropriate for discovery may be published by the UPnP AV media server 604, and subsequently advertised, step 612, to client devices 606 on the home network 628 via a content directory service.

A client device 606 may discover and enumerate the content that the UPnP AV media server is advertising, steps 614 and 616. The client device may also discover renderers on the home network 628. Based on a user selection, the client device hands the URL of the content to an appropriate renderer for consumption. Alternatively, the client device may comprise the renderer, in which case the client device uses the URL of the content to appropriately render the asset. Where a fully qualified Internet URL identifies the content and the client 606 is capable of make requests over the Internet 626, the client 606 makes a direct request for content to the third party server 602 over the Internet 626, steps 614 and 616. The third party server may respond directly to the client 606, step 616, via transport streaming mechanisms known to those of skill in the art, such as HTTP, RTSP, etc.

For client devices 606 that are not capable of connecting to the Internet 626 and/or there is no capability to stream the content directly to the client device 606 due to user personalization, authentication, or other content protection considerations (e.g., digital rights management controls), the URL may be a logical URL that points back to the UPnP AV media server 604. Thus, a content request, step 618, may be issued to the UPnP AV media server 604, which resolves the logical URL to a physical URL, applies the user's authentication credentials and makes the content request to the third party server, step 620. The UPnP AV media server 604 receives the personalized content in the form of a content response, step 622, and streams the content to the client 606, step 624. According to this embodiment, music that comprises DRM access controls may be streamed to a client device 606.

According to an alternative embodiment, the content may reside on the UPnP AV media server 604, obviating the need to issue a request to the third party server 602. According to another embodiment, the third party server 602 may be a PC located on the home network 628. For example, assume that the client 606 is request a photo asset. The UPnP AV media server 604 resolves the request to a third party URL, retrieves the user's authentication cookie and presents both to the third party server 602 as part of a content request, step 620. The third party server 602 retrieves the photo that the client is requesting from the user's account and sends the photo information to the UPnP AV media server 604, step 622. The UPnP AV media server 604 sends the personalized response to the client 606, step 624, which displays the photo. It should be appreciated by those of skill in the art that the client is agnostic regarding the source of the photo and is not provided with information regarding where the photo resides or who owns the photo.

Figure 7:
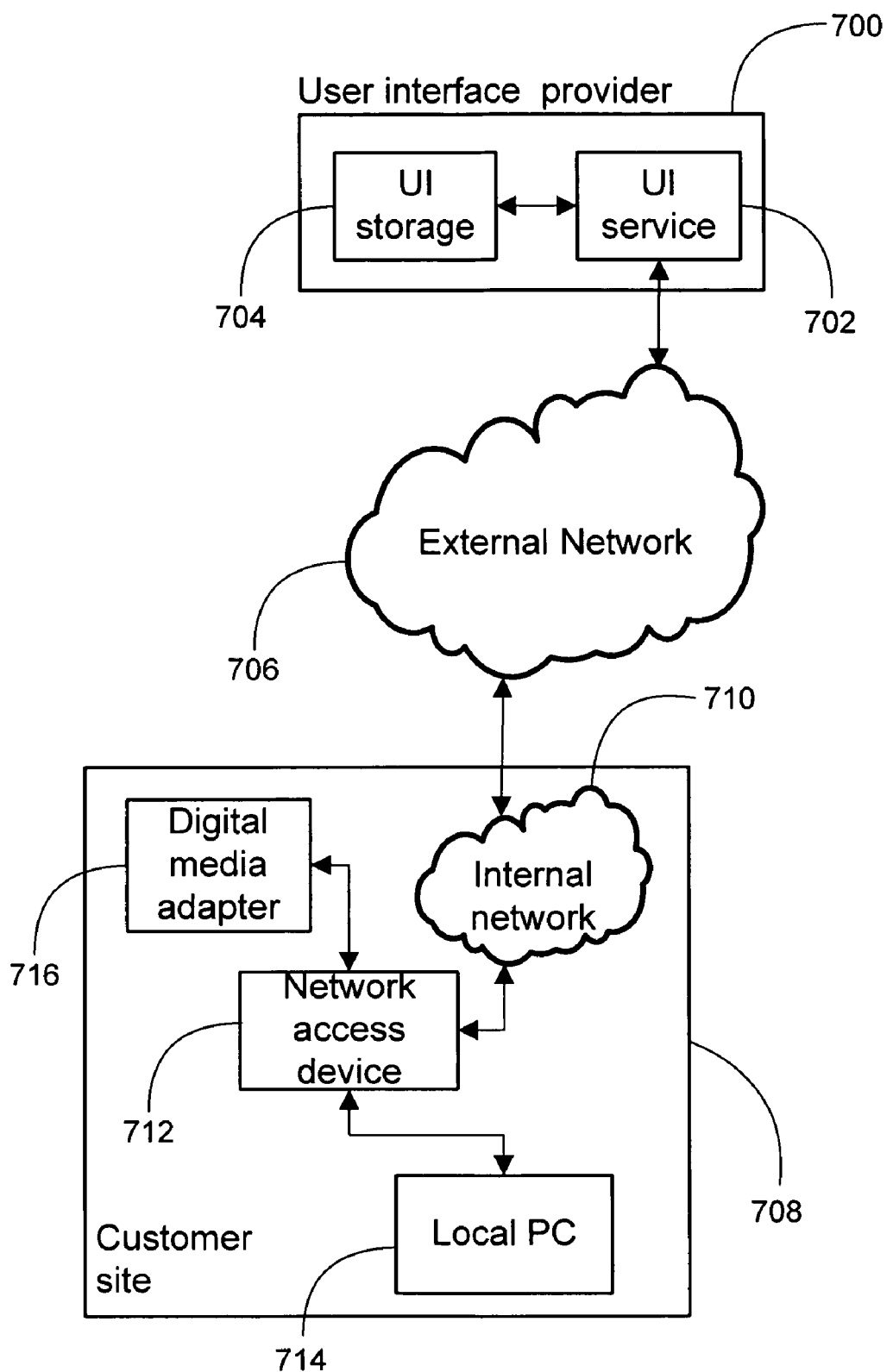
FIG. 7 is a block diagram illustrating a system for providing access to network based user interfaces according to one embodiment of the present invention.

As described above, the present invention provides for universal access to content and services, which includes network based user interface services. FIG. 7 presents a block diagram illustrating one embodiment of a system for providing access to network based user interfaces. According to the embodiment of FIG. 7, a user interface provider 700 comprises a user interface ("UI") service 702 and a data store for storage of UI content 704. The UI provider 700 is communicatively coupled to a network, such as an external network 706, which may comprise one or more local and wide area networks, e.g., the Internet. The UI service 702 at the UI provider 700 is operative to provide user interfaces to requesting clients. According to one embodiment of the invention, the UI service 702 receives requests for user interfaces, which the UI service 702 retrieves from the UI data store 704 for transmission to and display by requesting clients. Alternatively, or in conjunction, the UI service 702 may dynamically generate UI content using preference or profile data from one or more users, which may include UI content from the UI data store 704. Advantageously, the UI that the UI service 702 provides may be a "10 foot" UI suitable for display on a television or similar display device.

Connected to the external network 706 are one or more customers 708 of the UI provider 700. A given customer site 708 comprises an internal network 710, a network access device 712, a personal computer 714 that is local to the customer site 708 and a digital media adapter 716 or similar client device for requesting and displaying a user interface. The user employs the network access device 712 in communication with the digital media adapter 716 and local PC 714 to access one or more network based user interfaces made available by the UI provider 700. According to one embodiment, the system of the present invention is operative to provide a network based 10 foot UI to the digital media adapter using the UPnP frameworks described herein, e.g., the interface framework illustrated at FIG. 5.

The digital media adapter 716 initializes and attempts to communicate over the network access device 712 to locate one or more UPnP media servers, e.g., the Yahoo! Media Server. According to one embodiment, the digital media adapter 716 utilizes the standard UPnP XRT-2 eventing protocol, which is part of the UPnP remote UI specification. The digital media adapter 716 identifies one or more UPnP servers made available by the local PC 714 by way of the network access device 712. For example, the digital media adapter may connect to the Yahoo! Media Server that is being subscribed to by the Yahoo! Music Engine or Yahoo! Messenger. It should be noted that a give media server may provide multiple services. Accordingly, the UPnP server at the local PC 714 has access to the identity of the user and may access local or remote user profile data for the user.

The digital media adapter 716 issues a request to the local PC 714 for a user interface. According to one embodiment, the digital media adapter 716 issues a remote UI request to the PC 714 according to the remote UI XRT-2 protocol whereby software components at the local PC manage events that the digital media adapter 716 generates, although the system may utilize other protocols for requesting user interfaces know to those of skill in the art. The local PC 714 receives the UI request and attempts to access the UI service 702 of the UI provider 700 to retrieve a user interface. The local PC 714 may access the UI service 702 over the internal 716 and external networks 706 using any number of transmission protocols know to those of skill in the art, e.g., HTTP.

The local PC 714 receives a link to a user interface from the UI service 702, which the local PC 714 forwards to the digital media adapter 716. The local PC 714 may execute an HTTP redirect request to forward the link to the digital media adapter 716 via the network access device 712, as the local PC 714 is aware of the addressing or location information for the digital media adapter 716. The digital media adapter 716 uses the link that it receives from the local PC 714 to directly request the user interface from the UI service 702 via the network access device 712. In situations where the digital media adapter 716 does not have access to a communications channel to the external network 706, e.g., via the internal network 710, the local PC 714 may act as a proxy to forward the request to the UI service 702 at the UI provider 700. Advantageously, the local PC 714 does not perform any manipulation or transformation of the UI or UI content that the UI service 702 transmits to the digital media adapter 716, as the UI service 702 generates an appropriate network based UI for the digital media adapter 716, which may include the use of profile information previously described.

Figure 8:
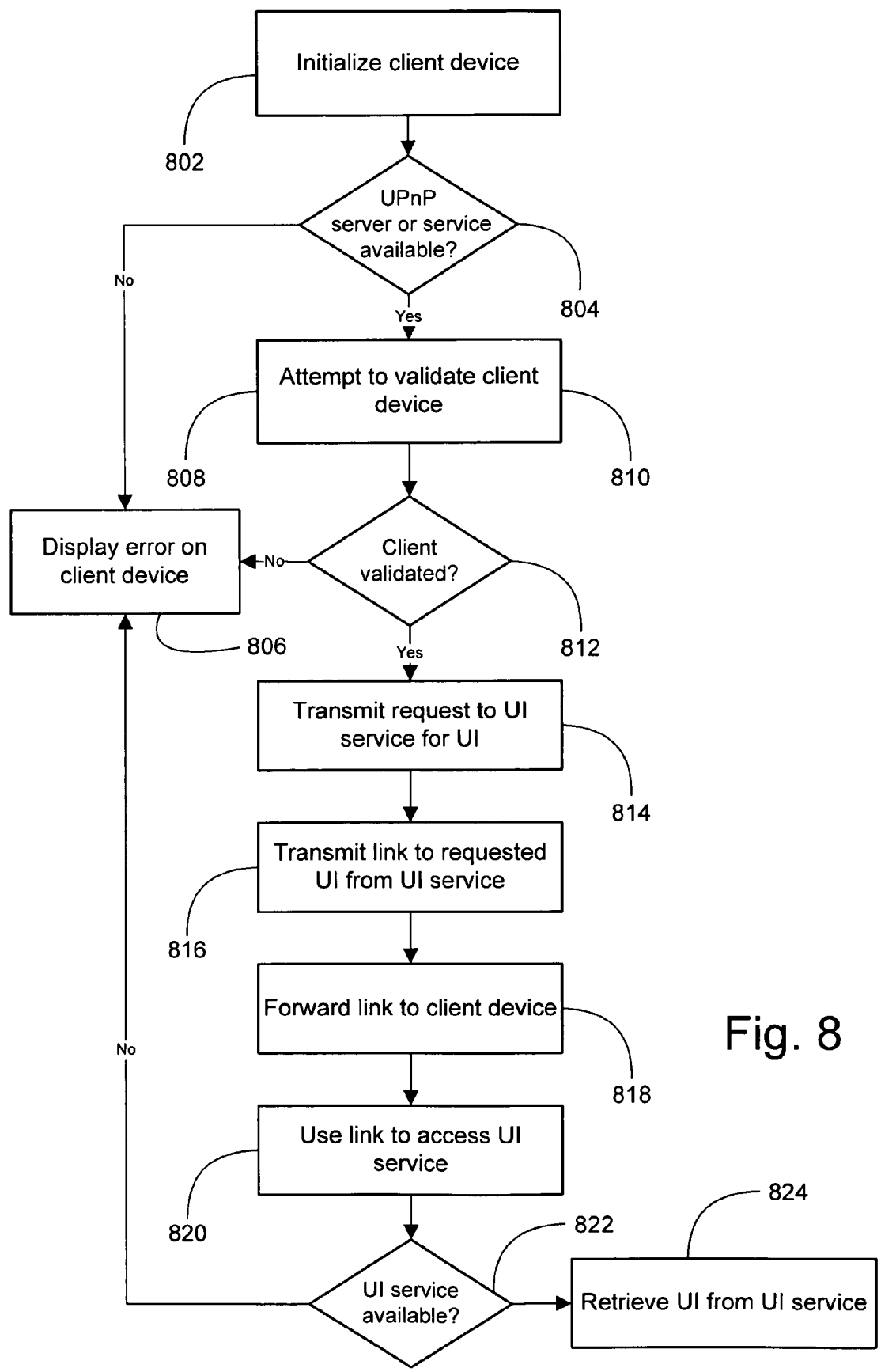
FIG. 8 is a flow diagram illustrating a method for providing access to network based user interfaces according to one embodiment of the present invention.

One embodiment of a method for using the present invention for the distribution of one or more user interfaces is illustrated at FIG. 8. The method begins with the client device initializing, step 802, which may include the client device broadcasting or transmitting descriptive information over a local network, e.g., where the client device is a UPnP digital media adapter, announcing the presence of the digital media adapter to UPnP services or servers available on the local network. A check is performed to determine if UPnP services or servers are available both locally and remotely, step 804, which may comprise a check to determine if a media server is available on the local network, e.g., Yahoo! Music Engine. Where there are no UPnP services or servers available to the client device, step 804, the client device displays an error message to the user indicating the lack or available UPnP services or servers, step 806.

An attempt may be made to validate the client device, step 812. For example, where the client device is connecting to or registering with one or more UPnP servers, which may be conducted according to techniques described herein, the UPnP server may validate that a connection may be made by the client device. As part of the validation step, the UPnP server may associate a user name, id or token with the client device such that the client device may receive one or more user interfaces that are customized for the user, in addition to generic user interfaces. Where the client device is unable to be validated, step 812, an error is returned to the client device for display to the user indicating that the UPnP server is unable to validate the client device, step 806.

Where UPnP servers or services are available to the client device, step 804, and the client device is successfully validated, step 812, a request is transmitted to a UI service or server for a user interface or UI content, which a UI service may use to generate a user interface, step 814. According to one embodiment, the client device issues a remote UI request to the client in accordance with the UPnP remote UI protocol specification that the local PC, which handles remote UI eventing on the local network, propagates to the UI service. The local PC may utilize any number of transmission protocols know to those of skill in the art, e.g., HTTP. The UI request may optionally comprise personalization information to allow the UI service to generate a customized UI. Alternatively, the request may comprise a user identifier that the UI service may use to access one or more user profiles when generating a customized user interface, e.g., profile information for the requesting user and users who are members of a given community of users.

In response to transmission of the UI request, step 814, which may be received by a UI service at a UI provider, a link is transmitted for accessing the requested UI, step 816. According to one embodiment, the UI service transmits the link for accessing the requested UI to the local PC, which may be conducted according to the same or a different transmission protocol utilized to transmit the UI request. The link to the user interface is forwarded to the client device, step 818, which may comprise the local PC executing an HTTP redirect to pass the link to the client device. Alternatively, the link may be encapsulated within a remote UI response from the local PC.

The client device receives the link that the local PC forwards, step 818, and attempts to use the link to access the UI service and retrieve the requested user interface, step 820. A check is performed to determine if a communications path exists over which the client device may to retrieve the user interface that the client device is requesting, step 822. Where the UI service is unavailable, step 822, the client device displays an error message to the user indicating that the UI service is unavailable, step 806. Where a communications path does not exist between the client device and the UI provider, step 820, the client device may use a local PC as a proxy for accessing the UI provider, step 822. Where the client device is able transmit the UI request to the UI provider, step 822, the UI is retrieved from the UI provider, step 824. According to one embodiment, the client device retrieves a 10 foot UI from the UI provider for display on a television or similar display device. Processing may return to step 814 when a subsequent UI is requested by the client device.

Figure 9:
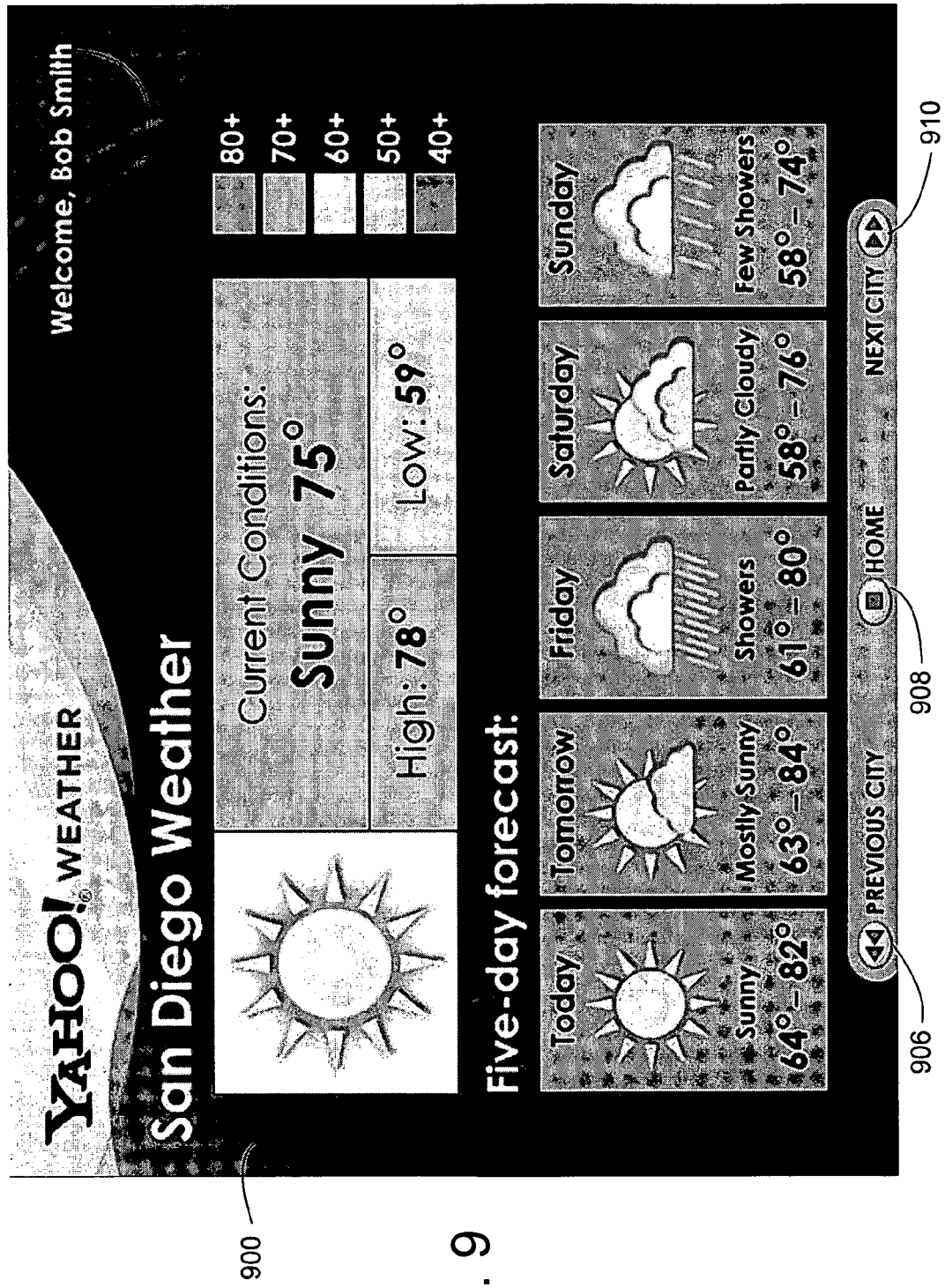
FIG. 9 is a screen diagram illustrating a network based user interface for the presentation of personalized weather information according to one embodiment of the present invention.
Figure 10:
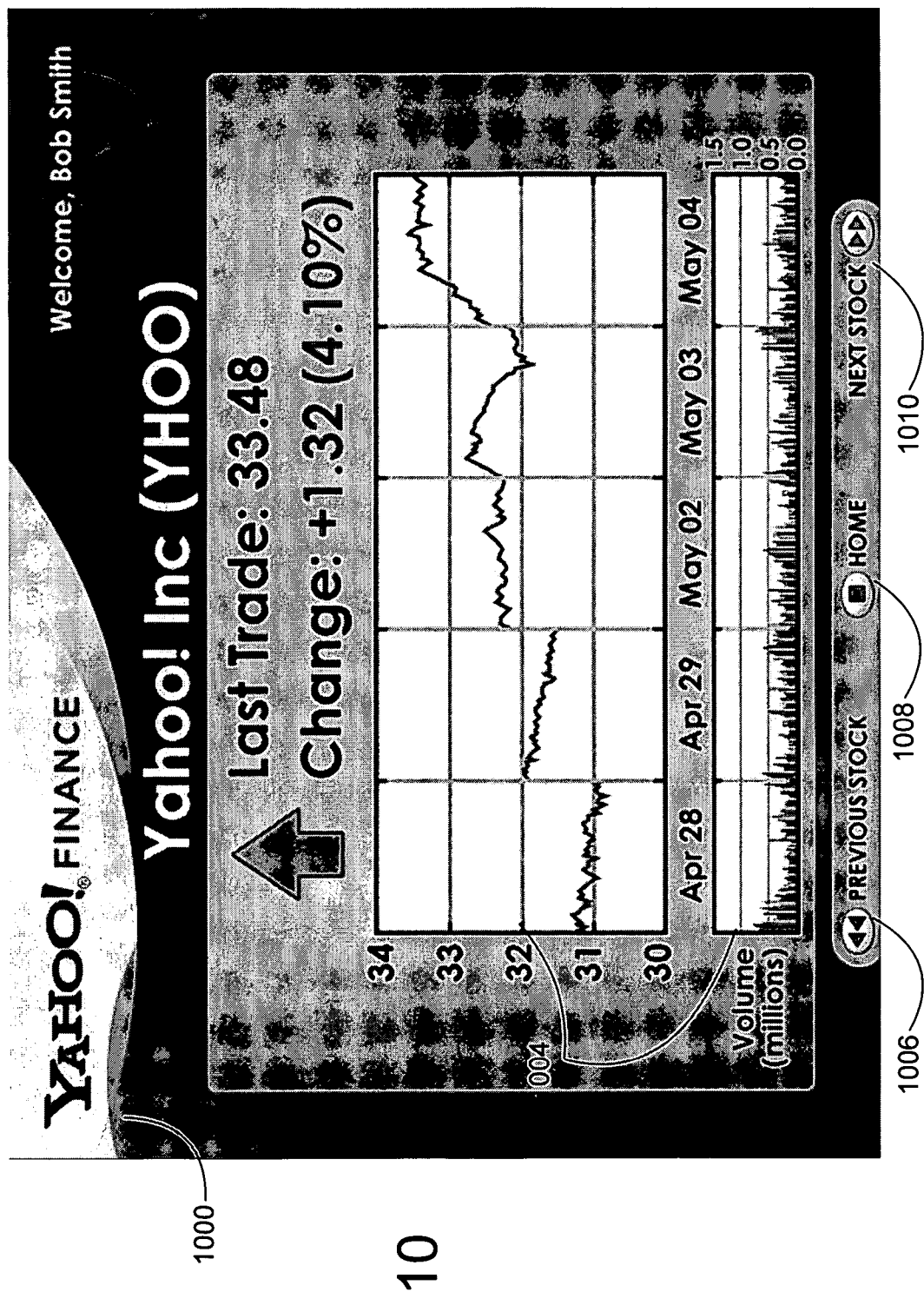
FIG. 10 is a screen diagram illustrating a network based user interface for the presentation of personalized financial information according to one embodiment of the present invention.

FIGS. 9 and 10 present screen diagrams illustrating two exemplary customized user interfaces that may be generated by the systems and methods of the present invention. According to the screen diagram of FIG. 9, a network-based user interface 900 is presented that provides customized weather information 904. The user interface 900 is customized for a given user 902, in the present embodiment the user Bob Smith. The weather information 904 in the interface may be generated using profile data for the given user or users in a given community of users, such as a social network of users related to the given user. The interface 900 also provides controls for navigating to other network based weather user interfaces 906 and 910, as well as a home page 908 user interface.

FIG. 10 presents another exemplary network-based user interface 1000 that provides customized financial information 1004. The user interface is again customized for a given user 1002, although generic or non-customized network-based user interfaces may be utilized. The financial information 1004 in the interface may be generated using profile data for the given user or users in a given community of users, such as a social network of users related to the given user. The interface 1000 also provides controls for navigating to other network based financial user interfaces 1006 and 1010, as well as a home page 1008 user interface.

Figure 11:
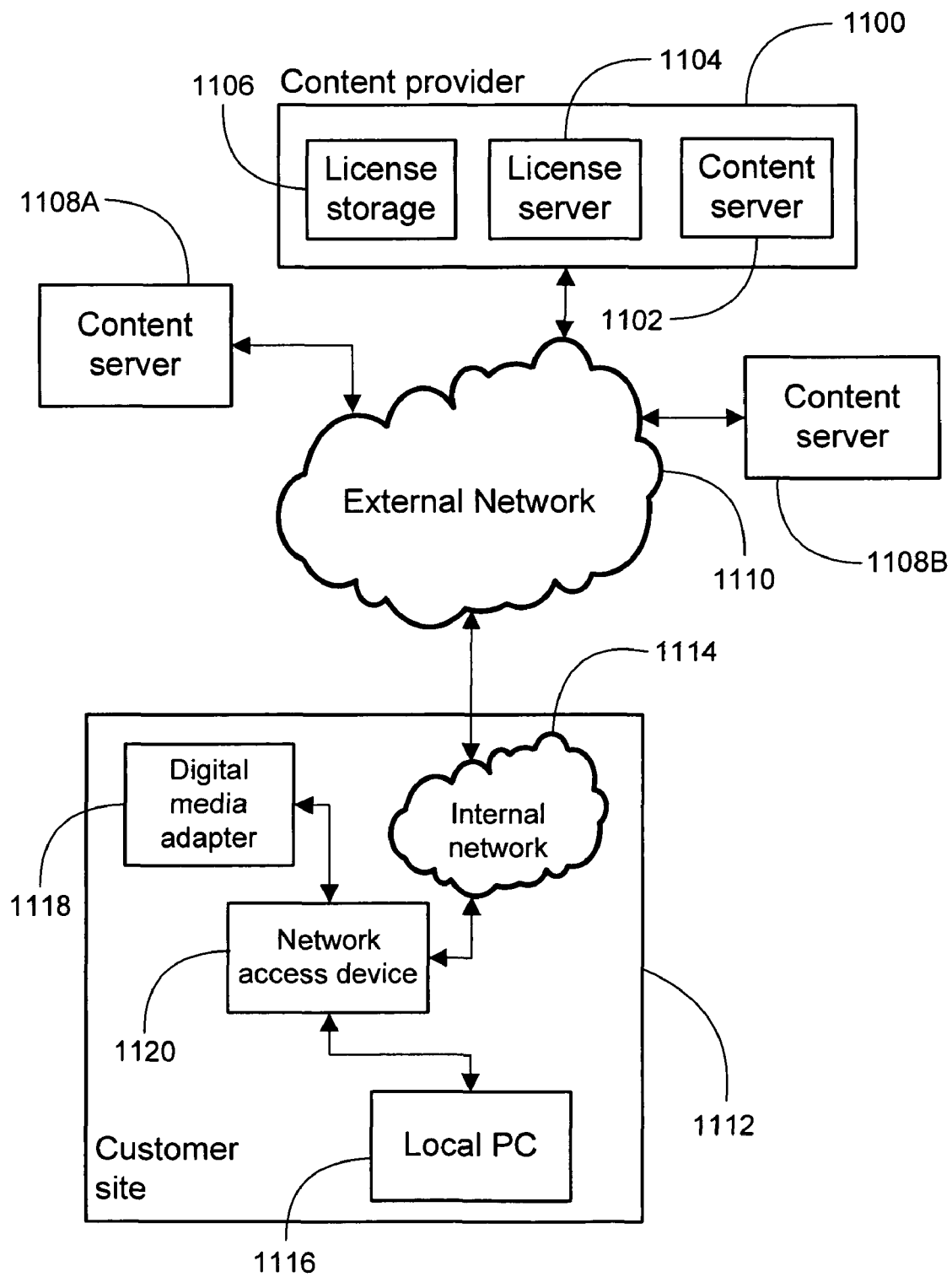
FIG. 11 is a block diagram illustrating a system for the distribution of DRM protected content to network devices.

In addition to utilizing the present invention for the distribution of services and content, including network based user interfaces, the present invention may also be utilized for the distribution of content protected by digital rights management access controls ("DRM") to UPnP client devices, as is illustrated by the system of FIG. 11. According to FIG. 11, content servers 1102, 1108A and 1108B are communicatively coupled to an external network 1110, which may comprise one or more local and wide area networks, e.g., the Internet. The content servers 1102, 1108A and 1108B are operative to distribute content to requesting clients utilizing DRM, thereby placing access controls on the content that the content servers distribute. It should be noted that the content servers 1102, 1108A and 1108B may distribute non-DRM protected content in conjunction with DRM protected content.

Most typical licensing schemes require that a client possess a valid license key in order to access the content protected by DRM access controls. Accordingly, a given content provider 1100 may comprise a license server 1104 and license data store 1106. The license server 1104 is operative to generate licenses that allow a client device to access DRM protected content, whereas the license data store 1106 provides persistent storage for a given user's licenses. Those of skill in the art recognize that the license server 1104 and license data store 1106 may be located at the customer site 1112 or on servers and data stores communicatively coupled to the external network 1110. According to one embodiment of the present invention, the licensing scheme used to control access to content is the Windows Media Digital Rights Management ("WMDRM") platform, which may limit access to playback of content to one personal computer, or a limited set of personal computers and portable devices, e.g., five.

The customer site comprises a number of devices including, but not limited to, an internal network 1114, a network access device 1120, a digital media adapter 1118 and a personal computer 1116 that is local to the customer site 1112. As described herein in conjunction with certain embodiments, which may be used in conjunction with the present embodiment, the network access device 1120 may comprise a content management system that provides directory services for devices on the internal network, allowing these devices to identify and access services and media sources, e.g., content servers 1102, 1108A and 1108B, that are both local and remote to the customer site. When a client device attached to the internal network 1114 attempts to access an item of content that is protected by DRM access controls, however, the client device must utilize the local PC 1116 to which the license for a given item of content is assigned. For example, assume that a given user purchases a license to playback a DRM protected content item on the local PC 1116. When the user attempts to access the DRM protected content item using the digital media adapter 1118, playback is prevented as the digital media adapter 1118 lacks the required license.

In order to overcome this limitation of the use of DRM protected content within an internal network 1114, a client device such as a digital media adapter 1118 first issues a request to the local PC for DRM protected content. The local PC 1116 receives the content request and contacts a given content server 1102, 1108A and 1108B to initiate transmission of a DRM protected content stream, which the local PC 1116 decrypts through the use of a license or similar certificate associated with the DRM protected content stream. The DRM protected content stream may be encoded using a first DRM licensing scheme, which according to one embodiment is WMDRM. The digital media adapter 1118 or other client device attached to the network access device 1120 also provides the local PC 1116 with a public encryption key. Public key encryption, also known as asymmetric cryptography, generates unique public/private key pairs of mathematically related numbers that are utilized to protect content. The public key is made available to anyone who wishes to use it, while its holder keeps the private key secret. Content encrypted with a given public key may only be decrypted by the corresponding private key, thereby ensuring the integrity of the encrypted content.

The local PC 1116 receives the DRM protected content, which it decrypts using the license key corresponding to the DRM protected content, as well as a public key from the digital media adapter 1118. The local PC 1116 re-encrypts the decrypted DRM protected content using the public key that it receives from the digital media adapter 1118. A public key may be used by the local PC 1116 to encrypt the DRM protected content according to a second DRM licensing scheme, which according to one embodiment of the invention is the Windows Media Digital Rights Management—Network Device ("WMDRM-ND") platfrom. The digital media adapter 1118 receives the re-encrypted content stream from the local PC 1116, which the digital media adapter 1118 decrypts using the private key that corresponds to the public key sent to the local PC 1116. The digital media adapter 1118 then commences playback of the DRM protected content stream transmitted from a given content server 1102, 1108A and 1108B.

Figure 12:
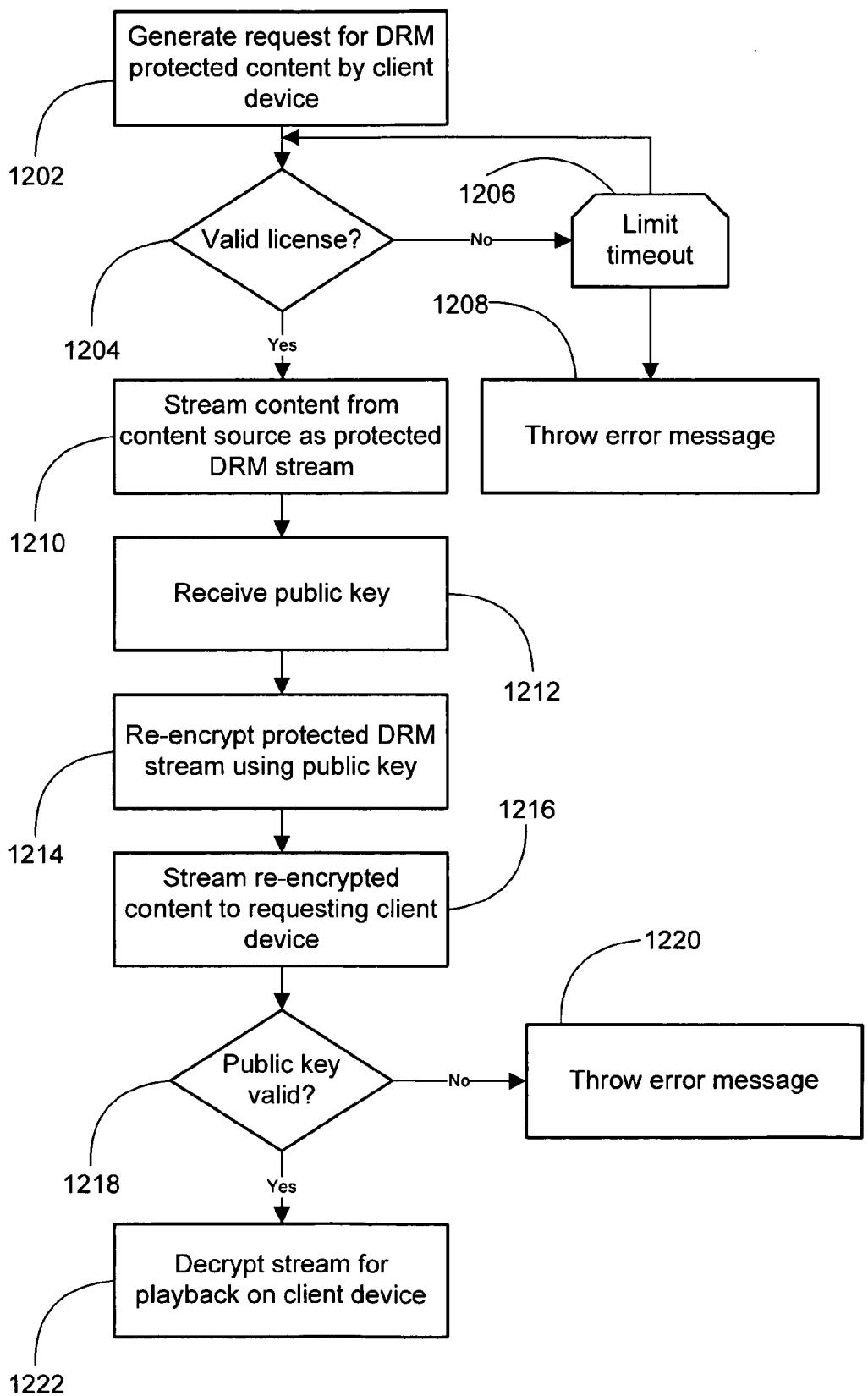
FIG. 12 is a flow diagram illustrating a method for the distribution of DRM protected content to network devices.

FIG. 12 presents a flow diagram illustrating one embodiment of a method for distributing DRM protected content to client devices communicatively coupled to a local network. According to the embodiment of FIG. 12, a request is generated by a client device for a content item protected by DRM access controls, step 1202. A check is performed to determine if a valid license exists for accessing the DRM protected content, step 1204. A valid license for accessing DRM protected content may reside at a customer site on a local data store or remote to the customer site, such as when maintained by a content provider or a license storage provider whereby a given user's content licenses reside on the network. The method continues to check for a valid license for the requested content, step 1204, until a limit is reached, step 1208. For example, a given number of locations may be checked for a valid license. When the limit is exceeded, step 1206, an error message is thrown to the client device for display to the user, step 1208.

Where a valid license is located or otherwise identifed, step 1204, the requested content is streamed from a content source as a protected DRM stream, step 1210. According to one embodiment, the requested content is streamed from a content source to a personal computer local to a customer site using the WMDRM platform, although other DRM platforms know to those of skill in the art may be utilized. A public key is also received from a client device requesting the DRM protected content, step 1212. The received DRM protected content stream is re-encrypted using the public key, which may be performed by the local PC or other device in possesion of a valid license for the DRM protected content stream. The re-encryption may be performed according to a second or disparate DRM platform from the first DRM platform utilized to provide DMR access controls for the DRM protected content stream. According to one embodiment, the DRM protected content stream is re-encrypted according to the WMDRM-ND DRM platform.

The re-encrypted content is streamed to the requesting client device, step 1216, e.g., the local PC transmits a re-encrypted content stream to the digital media adapter. A check is performed by the receiving client to determine if a valid public key was used to encrypt the stream, step 1218. The check may comprise attempting to decrypt the encrypted stream using the private key for the client device that corresponds to the public key for the client device. Where the client device's private key is not operative to decrypt the received stream, step 1218, the client device throws an error message for display to the user, step 1220. Where the stream is encrypted using a valid pubic key for the client device, step 1218, the client device decrypts the steam for playback, step 1222. For example, where the client device is a digital media adapter, playback may comprise presenting video content on a display device such as a television.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

I claim:

1. A method for providing Digital Rights Management ("DRM") protected content to one or more devices connected to a network, the method comprising:
   generating a request for DRM protected content from a requesting device;
   streaming the requested DRM protected content from a content source as a protected DRM stream, wherein the requested DRM protected stream is protected by one or more DRM access controls;
   validating the one or more DRM access controls protecting the DRM stream with the content source;
   re-encrypting, with a public/private key pair, the protected DRM stream to generate a re-encrypted protected DRM stream;
   streaming the re-encrypted protected DRM stream having the DRM protected content therein to the requesting device; and
   decrypting the re-encrypted protected DRM stream for playback on the requesting device.

2. The method of claim 1 wherein generating comprising generating a request by a client device.

3. The method of claim 2 wherein generating comprises generating a request by a digital media adapter.

4. The method of claim 1 wherein streaming content comprises streaming in accordance with Windows Media DRM.

5. The method of claim 1 wherein streaming comprises determining if a valid license exists to provide access to the protected DRM stream.

6. The method of claim 5 wherein determining comprises querying a license server for a valid license.

7. The method of claim 5 comprising:
   generating an error message where a valid license does not exist to provide access to the protected DRM stream; and
   displaying the error message on a client device.

8. The method of claim 1 wherein streaming comprises streaming to a local PC.

9. The method of claim 1 comprising:
   receiving a public key from the requesting device; and
   re-encrypting the protected DRM stream using the received public key.

10. The method of claim 1 comprising streaming the re-encrypting protected DRM stream in accordance with Windows Media DRM—Network Device.

11. The method of claim 1 wherein streaming the re-encrypting protected DRM stream comprises streaming from a local PC to a digital media adapter.

12. The method of claim 1 wherein decrypting comprises using a private key from the requesting device to decrypt the re-encrypted protected DRM stream.

13. The method of 12 comprising:
   determining if the private key matches a public key used to re-encrypt the protected DRM stream; and
   if the private key matches the public key, decrypting the re-encrypted protected DRM stream; and
   if the private key does not match the public key, generating an error message for display on a client device.

* * * * *